US012611704B2

(12) United States Patent
Kim et al.

(10) Patent No.: US 12,611,704 B2
(45) Date of Patent: Apr. 28, 2026

(54) STEEL PIPE FOR LINE PIPE WITH EXCELLENT LOW TEMPERATURE TOUGHNESS OF WELDED ZONE AND METHOD FOR MANUFACTURING THE SAME

(71) Applicant: NEXTEEL Co., Ltd., Pohang-si (KR)

(72) Inventors: Yi-Yong Kim, Pohang-si (KR); Kwang-Jin Choi, Ansan-si (KR); Dong-Jik Kum, Pohang-si (KR); Chang-Ki An, Pohang-si (KR); Si-Yun Choi, Pohang-si (KR); Young-Cheul Ahn, Pohang-si (KR); Jae-Yeon Cho, Pohang-si (KR)

(73) Assignee: NEXTEEL CO., LTD., Pohang-si (KR)

( * ) Notice: Subject to any disclaimer, the term of this patent is extended or adjusted under 35 U.S.C. 154(b) by 460 days.

(21) Appl. No.: 18/221,729

(22) Filed: Jul. 13, 2023

(65) Prior Publication Data

US 2024/0390967 A1     Nov. 28, 2024

(30) Foreign Application Priority Data

May 24, 2023     (KR) ........................ 10-2023-0066666

(51) Int. Cl.
C21D 9/08          (2006.01)
B21C 37/08          (2006.01)
(Continued)

(52) U.S. Cl.
CPC .............. B21C 37/08 (2013.01); B23K 13/00 (2013.01); C21D 8/10 (2013.01); C21D 9/085 (2013.01); C22C 38/002 (2013.01); C22C 38/02 (2013.01); C22C 38/04 (2013.01); C22C 38/06 (2013.01); C22C 38/12 (2013.01); C22C 38/14 (2013.01);
(Continued)

(58) Field of Classification Search
CPC ........ C21D 9/085; C21D 9/505; B23K 11/08; B23K 13/025
See application file for complete search history.

(56) References Cited

U.S. PATENT DOCUMENTS

| | | | |
|---|---|---|---|
| 9,873,164 B2 | 1/2018 | Toyoda et al. | |
| 2015/0251268 A1 | 9/2015 | Toyoda et al. | |

FOREIGN PATENT DOCUMENTS

| | | |
|---|---|---|
| JP | 2001-287061 A | 10/2001 |
| KR | 10-2006-0084595 A | 7/2006 |
| | (Continued) | |

OTHER PUBLICATIONS

Office Action issued on Jul. 24, 2023, for corresponding Korean Patent Application No. 10-2023-0066666, along with an English machine translation (12 pages).
(Continued)

*Primary Examiner* — Adam Krupicka
(74) *Attorney, Agent, or Firm* — Hauptman Ham, LLP

(57)     ABSTRACT

Disclosed are a steel pipe for a line pipe having excellent low temperature toughness in a welded zone thereof, and a method for manufacturing the same, in which alloy components and a ratio thereof are controlled, and high frequency heat-treatment is carried out on the welded zone, and immediately thereafter, a cooling process is performed thereon in a strictly controlled manner, thereby improving the low temperature toughness of the welded zone, such that a resulting steel pipe is suitable for use in a pipeline and an offshore structure.

6 Claims, 5 Drawing Sheets

(51) Int. Cl.

| | | |
|---|---|---|
| *B23K 13/00* | (2006.01) | |
| *C21D 8/10* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/12* | (2006.01) | |
| *C22C 38/14* | (2006.01) | |
| *B23K 101/10* | (2006.01) | |

(52) U.S. Cl.
 CPC .... *B23K 2101/10* (2018.08); *C21D 2211/005*
 (2013.01)

(56) References Cited

FOREIGN PATENT DOCUMENTS

| | | | |
|---|---|---|---|
| KR | 10-0761730 | B1 | 9/2007 |
| KR | 10-1536519 | B1 | 7/2015 |
| KR | 10-2119975 | B1 | 6/2020 |
| KR | 10-2022-0160866 | A | 12/2022 |
| KR | 10-2591212 | B1 | 10/2023 |
| WO | 2014/045590 | A1 | 3/2014 |

OTHER PUBLICATIONS

Notice of Allowance issued on Oct. 6, 2023, for corresponding Korean Patent Application No. 10-2023-0066666, along with an English machine translation (7 pages).
Canada Office Action issued on Sep. 5, 2024, in connection with the Canada Patent Application No. 3,205,276, 4 pages.

STEEL PIPE FOR LINE PIPE WITH EXCELLENT LOW TEMPERATURE TOUGHNESS OF WELDED ZONE AND METHOD FOR MANUFACTURING THE SAME

CROSS-REFERENCE TO RELATED APPLICATION

This application claims priority from Korean Patent Application No. 10-2023-0066666 filed on May 24, 2023 in the Korean Intellectual Property Office, and all the benefits accruing therefrom under 35 U.S.C. 119, the contents of which in its entirety are herein incorporated by reference.

BACKGROUND

Technical Field

The present disclosure relates to a steel pipe for a line pipe having excellent low temperature toughness in a welded zone thereof, and a method for manufacturing the same. More specifically, the present disclosure relates to a steel pipe for a line pipe having excellent low temperature toughness in a welded zone thereof, and a method for manufacturing the same, in which alloy components and a ratio thereof are controlled, and high frequency heat-treatment is carried out on the welded zone, and immediately thereafter, a cooling process is performed thereon in a strictly controlled manner, thereby improving the low temperature toughness of the welded zone, such that a resulting steel pipe is suitable for use in a pipeline and an offshore structure.

Description of Related Art

In general, in order to expand transport capacity and efficiency of a line pipe for long-distance transport of crude oil and natural gas, a high-strength steel sheet is required to increase transport pressure and transport capacity.

Accordingly, although line pipe steels up to API-X80 grade have been put into practical use, demand for a high-strength line pipe steel of API-X100 grade or higher is increasing.

In particular, when a steel pipe for a line pipe is used at low temperature, rapid brittle fracture may occur when a toughness of each of a welded zone and a base material is weak, such that there is a risk causing a large-scale accident. For this reason, the demand for improved low temperature toughness is gradually increasing.

Conventionally, only heat-treatment technology on the welded zone of the steel pipe for the line pipe in order to improve the low temperature toughness has been intensively researched. However, there is no research on a cooling system on the welded zone of the steel pipe for the line pipe in order to improve the low temperature toughness.

Related prior literature is Korean Patent Application Publication No. 10-2006-0084595 (published on 2006 Jul. 25). The document describes a method for manufacturing a steel pipe for submerged arc welding with excellent resistance against SSCC (Sulfide Stress Corrosion Cracking).

SUMMARY

A purpose of the present disclosure is to provide a steel pipe for a line pipe having excellent low temperature toughness in a welded zone thereof, and a method for manufacturing the same, in which alloy components and a ratio thereof are controlled, and high frequency heat-treatment is carried out on the welded zone, and immediately thereafter, a cooling process is performed thereon in a strictly controlled manner, thereby improving the low temperature toughness of the welded zone, such that a resulting steel pipe is suitable for use in a pipeline and an offshore structure.

One aspect of the present disclosure provides a method for manufacturing a steel pipe for a line pipe with excellent low temperature toughness of a welded zone thereof, the method comprising: (a) welding the welded zone in an electric resistance welding scheme while shaping a steel sheet for a line pipe containing 0.02 to 0.07% by weight of carbon into a cylindrical shape using a squeeze roll, thereby forming the steel pipe for the line pipe; (b) performing high frequency heat-treatment of the welded zone of the steel pipe for the line pipe; (c) rapidly-cooling the high frequency heat-treated welded zone to 550 to 710° C.; (d) air-cooling the rapidly-cooled welded zone to 300 to 400° C.; and (e) water-cooling the air-cooled welded zone.

In one implementation of the method, in the (a), the steel sheet for the line pipe contains: 0.02 to 0.07% by weight of carbon, 0.1 to 1.0% by weight of silicon, 1.0 to 2.0% by weight of manganese, 0.01 to 0.06% by weight of water-soluble aluminum, 0.001 to 0.10% by weight of titanium, 0.01 to 0.06% by weight of niobium, 0.01 to 0.1% by weight of vanadium, 0.1 to 0.6% by weight of molybdenum, 0.01% or smaller by weight of phosphorus, 0.01% or smaller by weight of sulfur, and the remainder Fe and unavoidable impurities.

In one implementation of the method, in the (b), the high frequency heat-treatment is carried out to a temperature of 900 to 980° C.

In one implementation of the method, in the (c), the rapid-cooling is carried out to a temperature of 640 to 680° C. and at a rate of 10 to 50° C./sec.

In one implementation of the method, the rapid-cooling is carried out using a rapid-cooling device, wherein the rapid-cooling device includes: a plurality of rapid-cooling nozzles spaced apart from the steel pipe for the line pipe and arranged so as to be spaced from each other; and a nozzle support supporting the rapid-cooling nozzles thereon.

In one implementation of the method, each of the rapid-cooling nozzles is installed so as to have an inclination of 20 to 40° with respect to a plane perpendicular to a surface of the welded zone of the steel pipe for the line pipe, wherein the rapid-cooling device sprays cooling water at a pressure of 3 to 10 kgf/cm$^2$ to the welded zone.

Another aspect of the present disclosure provides a steel pipe for a line pipe having excellent low temperature toughness of a welded zone thereof, wherein the steel pipe for the line pipe is formed by welding the welded zone in an electric resistance welding scheme while shaping a steel sheet for a line pipe containing 0.02 to 0.07% by weight of carbon into a cylindrical shape using a squeeze roll, wherein a microstructure of the welded zone of the steel pipe for the line pipe has a complex phase including spherical carbide and fine ferrite, wherein a shock absorption energy value of the welded zone at −45° C. is 27J or greater.

In one implementation of the steel pipe for the line pipe, the steel sheet for the line pipe contains: 0.02 to 0.07% by weight of carbon, 0.1 to 1.0% by weight of silicon, 1.0 to 2.0% by weight of manganese, 0.01 to 0.06% by weight of water-soluble aluminum, 0.001 to 0.10% by weight of titanium, 0.01 to 0.06% by weight of niobium, 0.01 to 0.1% by weight of vanadium, 0.1 to 0.6% by weight of molybdenum, 0.01% or smaller by weight of phosphorus, 0.01% or smaller by weight of sulfur, and the remainder Fe and unavoidable impurities.

In one implementation of the steel pipe for the line pipe, the fine ferrite has an average diameter of 10 μm or smaller, wherein the fine ferrite has an area ratio of 90 vol % or larger.

In one implementation of the steel pipe for the line pipe, the shock absorption energy value of the welded zone at −45° C. is in a range of 100 to 200J.

According to the steel pipe for a line pipe having excellent low temperature toughness in a welded zone thereof, and the method for manufacturing the same, alloy components and a ratio thereof are controlled, and high frequency heat-treatment is carried out on the welded zone, and immediately thereafter, a cooling process is performed thereon in a strictly controlled manner, thereby improving the low temperature toughness of the welded zone, such that a resulting steel pipe is suitable for use in a pipeline and an offshore structure.

As a result, according to the steel pipe for a line pipe having excellent low temperature toughness of the welded zone thereof according to the present disclosure and the method for manufacturing the same, the final microstructure of the welded zone has a complex phase including spherical carbide and fine ferrite, and has a shock absorption energy value at −45° C. in a range of 27J or greater.

More preferably, according to the steel pipe for a line pipe having excellent low temperature toughness of the welded zone thereof according to the present disclosure and the method for manufacturing the same, the final microstructure of the welded zone includes spherical carbide and fine ferrite with an average diameter of 3 to 7 μm, and the fine ferrite has an area ratio in a range of 75 to 90 vol %, so that the shock absorption energy value of the welded zone at −45° C. is in a range of 100 to 200J.

Effects of the present disclosure are not limited to the effects mentioned above, and other effects not mentioned will be clearly understood by those skilled in the art from the descriptions below.

DETAILED DESCRIPTIONS

Figure 1:
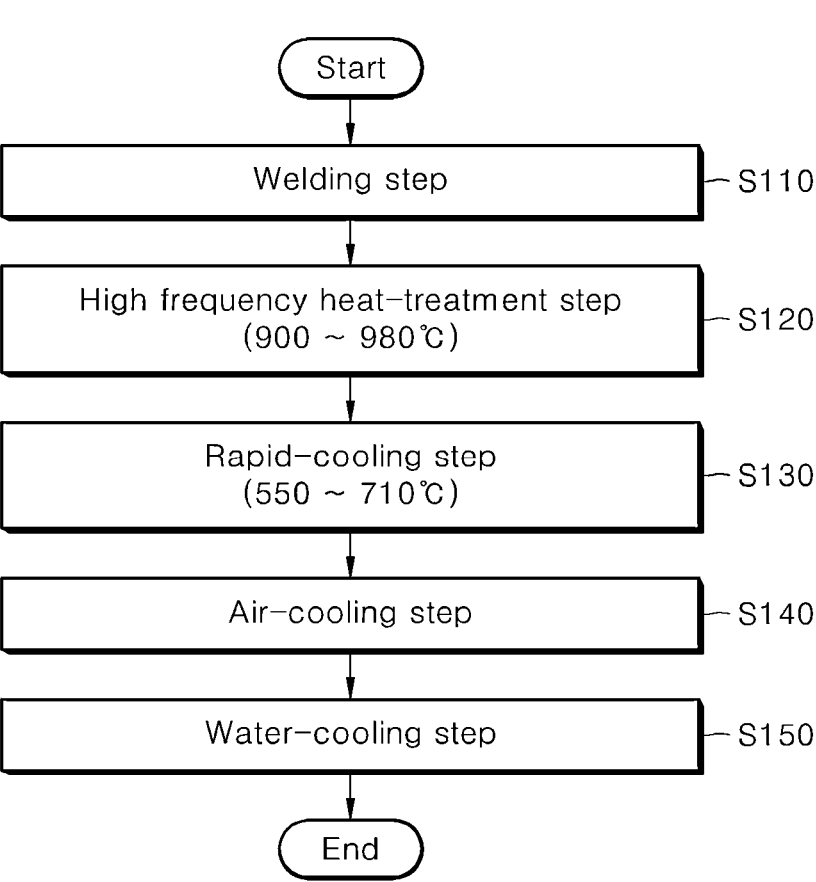
FIG. 1 is a process flow chart showing a method for manufacturing a steel pipe for a line pipe having excellent low temperature toughness of a welded zone thereof according to an embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be contained in the spirit and scope of the present disclosure as defined by the appended claims.

A shape, a size, a ratio, an angle, a number, etc. disclosed in the drawings for describing embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for describing embodiments.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Descriptions.

Hereinafter, a detailed description of a steel pipe for a line pipe having excellent low temperature toughness of a welded zone thereof according to a preferred embodiment of the present disclosure and a method for manufacturing the same will be set forth with reference to the accompanying drawings.

The present disclosure provides a steel pipe for a line pipe having excellent low temperature toughness in a welded zone thereof, and a method for manufacturing the same, in which alloy components and a ratio thereof are controlled, and high frequency heat-treatment is carried out on the welded zone, and immediately thereafter, a cooling process is performed thereon in a strictly controlled manner, thereby improving the low temperature toughness of the welded zone, such that a resulting steel pipe is suitable for use in a pipeline and an offshore structure.

To this end, the steel pipe for a line pipe having excellent low temperature toughness of a welded zone thereof is formed by welding the welded zone in an electric resistance welding scheme while shaping a steel sheet for a line pipe containing 0.02 to 0.07% by weight of carbon into a cylindrical shape using a squeeze roll, wherein a final microstructure of the welded zone of the steel pipe for the line pipe has a complex phase including spherical carbide and fine ferrite, wherein a shock absorption energy value of the welded zone at −45° C. is 27J or greater.

The steel sheet for the line pipe contains: 0.02 to 0.07% by weight of carbon, 0.1 to 1.0% by weight of silicon, 1.0 to 2.0% by weight of manganese, 0.01 to 0.06% by weight of water-soluble aluminum, 0.001 to 0.10% by weight of titanium, 0.01 to 0.06% by weight of niobium, 0.01 to 0.1% by weight of vanadium, 0.1 to 0.6% by weight of molybdenum, 0.01% or smaller by weight of phosphorus, 0.01% or smaller by weight of sulfur, and the remainder Fe and unavoidable impurities.

Furthermore, the fine ferrite has an average diameter of 10 μm or smaller, and the fine ferrite has an area ratio in a range of 90 vol % or larger. More preferably, the fine ferrite has an average diameter of 3 to 7 μm, and the fine ferrite has an area ratio in a range of 75 to 90 vol %.

Furthermore, it is more preferable that the welded zone of the steel pipe for the line pipe has a shock absorption energy value at −45° C. in a range of 100 to 200J.

Hereinafter, a role and a content of each of the components contained in the steel sheet for the line pipe having excellent low temperature toughness of the welded zone thereof according to an embodiment of the present disclosure will be described as follows.

Carbon (C): 0.02 to 0.07% by Weight

Carbon (C) is the most economical and effective element for strengthening steel by causing solid solution hardening and improving hardenability of steel. However, when the carbon is added in a large amount, weldability, formability and toughness may be deteriorated.

Therefore, carbon (C) is preferably added in a content of 0.02 to 0.07% by weight based on a total weight of the steel sheet for the line pipe according to the present disclosure, more preferably, 0.03 to 0.06% by weight based on the total weight of the steel sheet for the line pipe according to the present disclosure. When the amount of carbon (C) is smaller than 0.02% by weight, it is not economical because a relatively large amount of each of other alloy elements should be added to exhibit the same strength. Conversely, when the amount of carbon (C) is in excess of 0.07% by weight, weldability, formability and toughness may deteriorate.

Silicon (Si): 0.1 to 1.0% by Weight

Silicon (Si) plays a role of assisting aluminum to deoxidize molten steel, and also acts as a solid solution hardening element.

Silicon (Si) is preferably added in a content of 0.1 to 1.0% by weight based on the total weight of the steel sheet for the line pipe according to the present disclosure, more preferably, 0.03 to 0.06% by weight based on the total weight of the steel sheet for the line pipe according to the present disclosure. When the added amount of silicon (Si) is smaller than 0.1% by weight, it may be difficult to obtain clean steel because the deoxidizing role of the molten steel cannot be sufficiently performed. Conversely, when the amount of silicon (Si) is in excess of 1.0% by weight, red scales due to Si are formed during hot rolling, resulting in a very poor steel sheet surface shape and a significantly increased risk of brittle fracture.

Manganese (Mn): 1.0 to 2.0% by Weight

Manganese (Mn) is an element effective for solid solution hardening of the steel, and should be added in an amount of 1.0% by weight or greater to exhibit the solid solution hardening effect and to increase hardenability. However, when the amount of Mn as added exceeds 2.0% by weight, the segregation part is greatly developed in a center in a thickness direction when casting a slab in the steelmaking process, and the weldability of the final product is impaired.

Therefore, manganese (Mn) is preferably added in a content of 1.0 to 2.0% by weight based on the total weight of the steel sheet for the line pipe according to the present disclosure, more preferably, 1.2 to 1.6% by weight based on the total weight of the steel sheet for the line pipe according to the present disclosure.

Water Soluble Aluminum (Sol. Al): 0.01 to 0.06% by Weight

The water soluble aluminum (Sol. Al) is a major deoxidizer of the steel and therefore needs to be added in an amount of 0.01% by weight or greater. However, when the amount of the water-soluble aluminum (Sol. Al) is in excess of 0.06% by weight, the deoxidation effect is saturated. Thus, the water-soluble aluminum (Sol. Al) is preferably added in a content of 0.01 to 0.06% by weight based on the total weight of the steel sheet for the line pipe according to the present disclosure.

Titanium (Ti): 0.001 to 0.10% by Weight

Titanium (Ti) is a very useful element for refining crystal grains and is present as TiN in the steel and has the effect of suppressing the growth of crystal grains during the heating process for rolling. Ti remaining after reacting with nitrogen is dissolved in the steel and binds to carbon to form precipitates of TiC. The formed TiC is very fine, greatly improving the strength of the steel. Therefore, it is necessary to add at least 0.001% by weight or greater of Ti based on the total weight of the steel sheet for the line pipe in order to obtain an effect of suppressing austenite grain growth by the TiN precipitation and the increase in strength due to the TiC formation. However, when the added amount of titanium (Ti) exceeds 0.10% by weight, the effect is saturated. Further, when welding the steel sheet to manufacture the steel pipe, it rapidly heats up to the melting point and thus TiN is re-dissolved such that the toughness of a weld heat-affected zone is deteriorated.

Therefore, titanium (Ti) is preferably added in a content of 0.001 to 0.10% by weight based on the total weight of the steel sheet for the line pipe according to the present disclosure.

Niobium (Nb): 0.01 to 0.06% by Weight

Niobium (Nb) is an element that refines the austenite grain size, widens the non-recrystallized area, and contributes to refinement and strength improvement of the final structure.

Niobium (Nb) is preferably added in a content of 0.01 to 0.06% by weight based on the total weight of the steel sheet for the line pipe according to the present disclosure, more preferably, 0.02 to 0.04% by weight based on the total weight of the steel sheet for the line pipe according to the present disclosure. When the amount of niobium (Nb) is smaller than 0.01% by weight, it is difficult to properly exert the above effects. Conversely, when the added amount of niobium (Nb) exceeds 0.06% by weight, not only is it difficult to expect a further increase in effect, but also the austenite non-recrystallization temperature is excessively increased due to the precipitation of excessive Nb carbonitride, such that the material anisotropy increases. Furthermore, Nb is an expensive alloy element, and may act as a factor in increasing the production cost.

Vanadium (V): 0.01 to 0.1% by Weight

Vanadium (V) is added to improve the strength of the base metal and the welded zone of the steel.

Vanadium (V) is preferably added in a content of 0.01 to 0.1% by weight based on the total weight of the steel sheet for the line pipe according to the present disclosure, more preferably, 0.03 to 0.06% by weight based on the total weight of the steel sheet for the line pipe according to the present disclosure. When the added amount of vanadium (V) is smaller than 0.01% by weight, it is difficult to properly exhibit the effect of improving the strength of the base metal and the welded zone of the steel. Conversely, when the added amount of vanadium (V) exceeds 0.1% by weight, problems of deteriorating toughness and weldability may occur.

Molybdenum (Mo) 0.1 to 0.6% by Weight

Molybdenum (Mo) is added to improve the strength of the base metal and the welded zone of the steel. Molybdenum (Mo) is preferably added in a content of 0.1 to 0.6% by weight based on the total weight of the steel sheet for the line pipe according to the present disclosure, more preferably, 0.2 to 0.4% by weight based on the total weight of the steel sheet for the line pipe according to the present disclosure. When the added amount of molybdenum (Mo) is smaller than 0.1% by weight, it is difficult to properly exhibit the effect of improving the strength of the welded zone and the base material of the steel. Conversely, when the amount of molybdenum (Mo) as added is in excess of 0.6% by weight, this may act as a factor that only increases the manufacturing cost of the steel without further enhancing the effect.

Phosphorus (P): 0.01% by Weight or Smaller

Phosphorus (P) binds to Mn to form a non-metallic inclusion to embrittle the steel. Thus, a content thereof needs to be lowered. In order to reduce the content of phosphorus (P) to an extreme value, the steelmaking process load is increased. However, when a content of phosphorus (P) is 0.01% by weight or smaller, the above problem is not significant. Therefore, the upper limit of the content thereof needs to be limited to 0.01% by weight.

Sulfur (S): 0.01% by Weight or Smaller

Sulfur (S) is an element that binds to Mn to form a non-metallic inclusion to embrittle steel and cause hot shortness. In order to reduce the content of sulfur (S) to an extreme value, the steelmaking process load is increased.

However, when a content of sulfur(S) is 0.01% by weight or smaller, the above problem is not significant. Therefore, the upper limit of the content thereof needs to be limited to 0.01% by weight.

Hereinafter, a method for manufacturing a steel pipe for a line pipe having excellent low temperature toughness of a welded zone thereof according to an embodiment of the present disclosure will be described with reference to the accompanying drawings.

Figure 2:
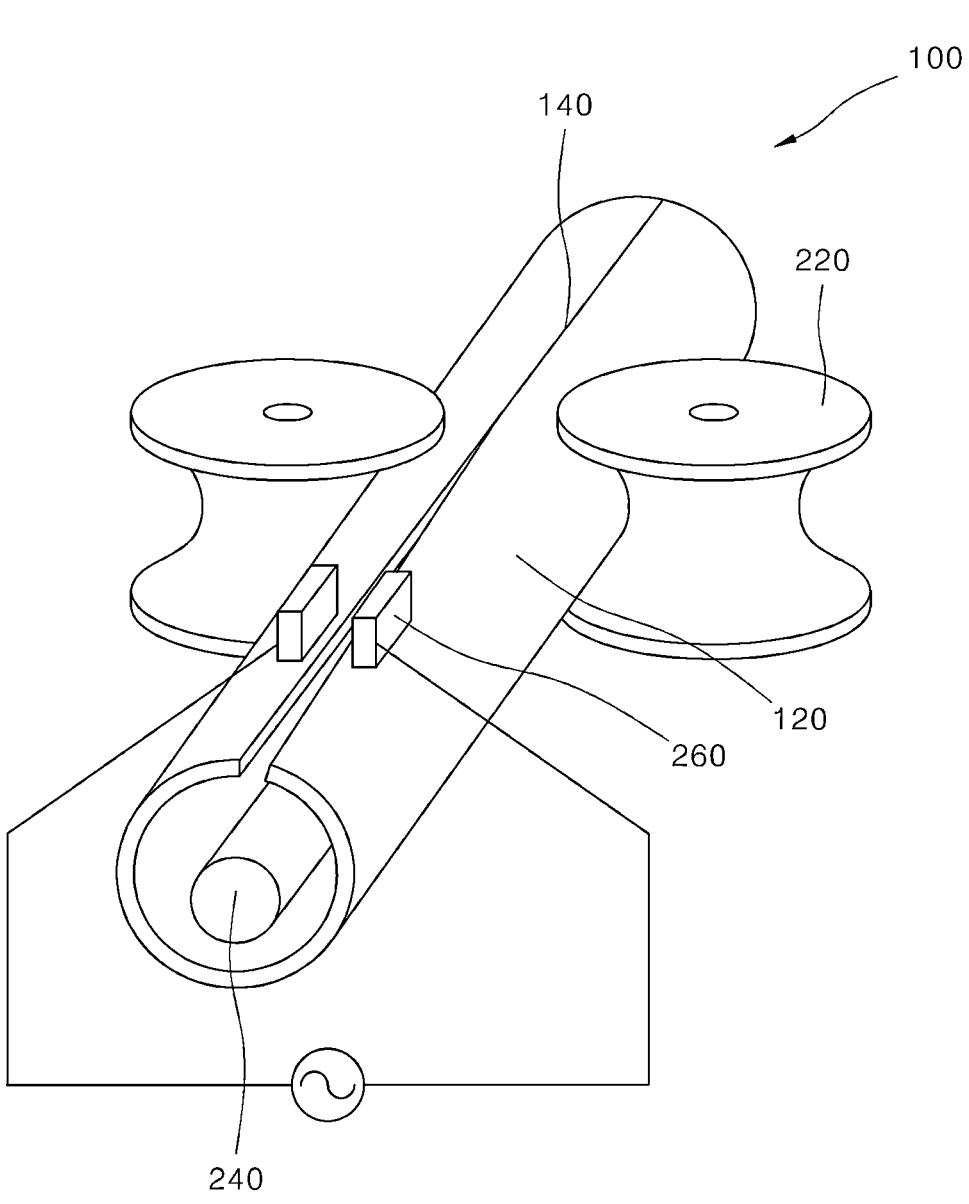
FIG. 2 is a schematic diagram showing a steel pipe for a line pipe in a state in which the steel pipe has been welded in an electric resistance welding scheme.
Figure 3:
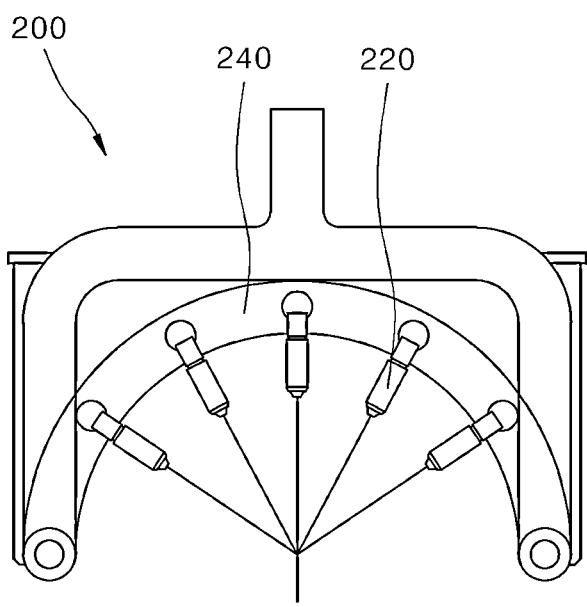
FIG. 3 and FIG. 4 are cross-sectional views showing a rapid-cooling device used in a method for manufacturing a steel pipe for a line pipe having excellent low temperature toughness of a welded zone thereof according to an embodiment of the present disclosure.
Figure 4:
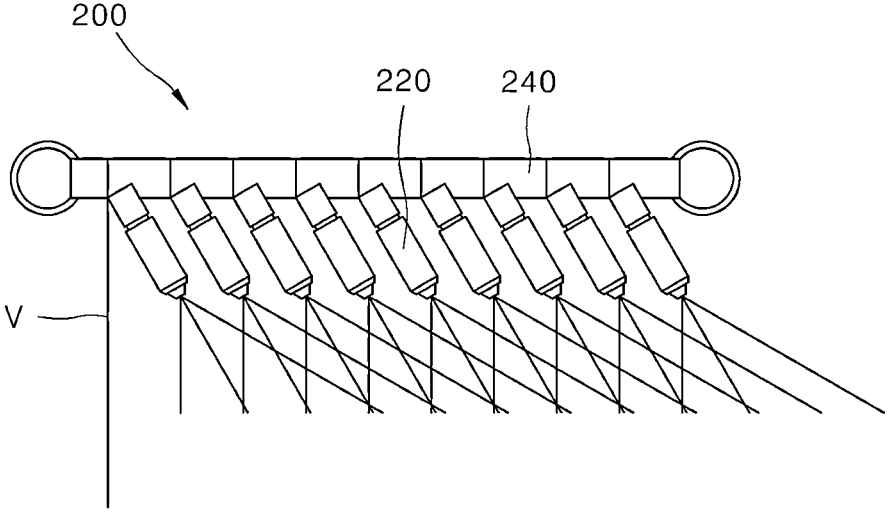

FIG. 1 is a process flow chart showing a method for manufacturing a steel pipe for a line pipe having excellent low temperature toughness of a welded zone thereof according to an embodiment of the present disclosure. FIG. 2 is a schematic diagram showing a steel pipe for a line pipe in a state in which the steel pipe has been welded in an electric resistance welding scheme. FIG. 3 and FIG. 4 are cross-sectional views showing a rapid-cooling device used in a method for manufacturing a steel pipe for a line pipe having excellent low temperature toughness of a welded zone thereof according to an embodiment of the present disclosure.

As shown in FIG. 1, a method for manufacturing a steel pipe for a line pipe having excellent low temperature toughness of a welded zone thereof according to an embodiment of the present disclosure includes a welding step in S110, a high frequency heat-treatment step in S120, a rapid-cooling step in S130, an air-cooling step in S140, and a water-cooling step in S150.

Welding

As shown in FIG. 1 and FIG. 2, in the welding step in S110, while a steel sheet 120 for the line pipe containing 0.02 to 0.07% by weight of carbon is shaped into a cylindrical shape using a squeeze roll, both opposing ends of the sheet facing each other is welded in an electric resistance welding scheme to form a steel pipe 100 for a line pipe.

That is, the steel sheet 120 for the line pipe is continuously shaped into the cylindrical shape using the squeeze roll 220 while moving the steel sheet 120 for the line pipe along a length direction thereof. Then, an impeder 240 is placed into an inner space defined in the cylindrical shape into which the steel sheet 120 for the line pipe is shaped, and a high frequency current is applied to a contact tip 260 to melt the steel sheet of the welded zone in a high frequency heating manner. Then, both opposing ends of the melt sheet 120 facing each other are bonded to each other so as to be merged into a V shape. In this way, the steel sheet 120 for the line pipe is welded. Accordingly, a welded zone 140 in which the sheet is welded in the electric resistance welding scheme along the length direction is disposed on an upper surface of the steel pipe 100 of the cylindrical shape.

In this step, the steel sheet 120 for the line pipe contains 0.02 to 0.07% by weight of carbon, 0.1 to 1.0% by weight of silicon, 1.0 to 2.0% by weight of manganese, 0.01 to 0.06% by weight of water-soluble aluminum, 0.001 to 0.10% by weight of titanium, and 0.01% to 0.06% by weight by weight of niobium, 0.01 to 0.1% by weight of vanadium, 0.1 to 0.6% by weight of molybdenum, 0.01% by weight or smaller of phosphorus, 0.01% by weight or smaller of sulfur, and the remainder Fe and unavoidable impurities.

High Frequency Heat Treatment

As shown in FIG. 1 and FIG. 2, in the high frequency heat-treatment step in S120, the welded zone 140 of the steel pipe 100 for the welded line pipe is subjected to high frequency heat-treatment.

In this high frequency heat-treatment, it is preferable to perform selectively high frequency heat-treatment only on the welded zone 140 of the steel pipe 100 for the line pipe immediately after the welding in the electric resistance welding scheme. When the high frequency heat-treatment selectively heats only the welded zone 140 of the steel pipe 100 for the line pipe in which the sheet has been welded in the electric resistance welding scheme, this may locally heat only the welded zone 140 of the steel pipe 100 for the line pipe without thermal effect on the base material of the steel sheet 120 of the line pipe such that the low temperature toughness of the welded zone 140 of the line pipe steel pipe 100 can be improved In this step, the high frequency heat-treatment is preferably carried out under a temperature condition of 900 to 980° C., more preferably, 920 to 960° C. for 5 to 30 seconds. When the high frequency heat-treatment temperature is lower than 900° C. or the high frequency heat-treatment time is smaller than 5 seconds, it may be difficult to secure the strength. Conversely, when the high frequency heat-treatment temperature exceeds 980° C. or the high frequency heat-treatment time exceeds 30 seconds, this may cause rapid brittle fracture due to deterioration of the toughness.

Rapid-Cooling

As shown in FIG. 1, FIG. 3 and FIG. 4, in the rapid-cooling step in S130, the high frequency heat-treated welded zone is rapidly cooled to a temperature 550 to 710° C.

In accordance with the present disclosure, the method selectively cools only the high frequency heat-treated welded zone during the rapid-cooling, such that the base material of the steel sheet for the line pipe is not cooled.

In this step, the rapid-cooling is performed such that the welded zone is more preferably cooled to 640 to 680° C. at a rate of 10 to 50° C./sec, and is most preferably cooled to 640 to 680° C. at a rate of 20 to 40° C./sec.

When the temperature to which the welded zone is cooled in the rapid-cooling step is lower than 550° C., a brittle phase may be formed in the high frequency heat-treated welded zone to lower the toughness and to deteriorate the pipe making properties. Conversely, when the temperature to which the welded zone is cooled in the rapid-cooling step exceeds 710° C., low-temperature impact toughness is lowered due to the pearlite structure having a coarse crystal grain size and the production of carbides precipitated at grain boundaries, such that rapid brittle fracture may occur.

When the rapid-cooling rate is smaller than 10° C./sec, it may be difficult to secure strength and toughness. Conversely, when the rapid-cooling rate exceeds 50° C./sec, it may be difficult to secure low-temperature impact toughness due to the occurrence of hardening phase.

As shown in FIG. 3 and FIG. 4, the rapid-cooling may be performed using a rapid-cooling device 200. The rapid-cooling device 200 includes rapid-cooling nozzles 220 spaced apart from each other and spaced from the steel pipe for the line pipe, and a nozzle support 240 for supporting the rapid-cooling nozzles 220 thereon.

In this regard, the rapid-cooling nozzles 220 may be installed so as to have an inclination of 20 to 40° with respect to a plane perpendicular to a surface of the welded zone of the steel pipe for the line pipe, and may spray a cooling water at a pressure of 3 to 10 kgf/cm² to the welded zone. More preferably, the rapid-cooling nozzles 220 may be installed so as to have an inclination of 25 to 35° with respect to a plane perpendicular to a surface of the welded zone of the steel pipe for the line pipe, and may spray a cooling water at a pressure of 6 to 9 kgf/cm² to the welded zone.

In accordance with the present disclosure, when the rapid-cooling nozzles 220 is installed so as to have an inclination of 20 to 40° with respect to a plane perpendicular to a surface of the welded zone of the steel pipe for the line pipe, the rapid-cooling nozzles 220 is able to uniformly spray the cooling water locally only onto the welded zone of the steel pipe for the line pipe.

In this regard, when the cooling water spray pressure is lower than 3 kgf/cm², it may be difficult to secure strength and toughness. Conversely, when the cooling water spray pressure exceeds 10 kgf/cm², excessive cooling may cause a problem in that low-temperature impact toughness is lowered.

Air-Cooling

As shown in FIG. 1, in the air-cooling step in S140, the previously rapid-cooled welded zone is air-cooled to 300 to 400° C.

This air-cooling is performed to control an internal structure. When an air cooling target temperature is lower than 300° C., the effect is not only saturated, but also a problem of deterioration of low-temperature impact toughness due to excessive cooling may occur. Conversely, when the air cooling target temperature exceeds 400° C., it may be difficult to form ferrite having fine crystal grains and spherical carbide sufficiently.

Water-Cooling

As shown in FIG. 1, in the water-cooling step in S150, the air-cooled welded zone is water-cooled.

In the water-cooling, it is preferable that a water-cooling target temperature is a room temperature such that the air-cooled welded zone is cooled to the room temperature, and a target water-cooling rate is 10° C./sec or smaller. In this regard, the room temperature may be in a range of −20 to 40° C. However, the present disclosure is not limited thereto.

In this way, the method for manufacturing the steel pipe for the line pipe having excellent low temperature toughness of the welded zone thereof according to an embodiment of the present disclosure may be completed.

According to the steel pipe for a line pipe having excellent low temperature toughness in the welded zone thereof as manufactured by the above steps S110 to S150, alloy components and a ratio thereof are controlled, and high frequency heat-treatment is carried out on the welded zone, and immediately thereafter, a cooling process is performed thereon in a strictly controlled manner, thereby improving the low temperature toughness of the welded zone, such that a resulting steel pipe is suitable for use in a pipeline and an offshore structure.

Thus, according to the steel pipe for a line pipe having excellent low temperature toughness in the welded zone thereof as manufactured by the above steps S110 to S150, the final microstructure of the welded zone of the steel pipe for the line pipe has a complex phase including spherical carbide and fine ferrite, wherein a shock absorption energy value of the welded zone at −45° C. is 27J or greater.

Further, according to the steel pipe for a line pipe having excellent low temperature toughness in the welded zone thereof as manufactured by the above steps S110 to S150, the fine ferrite has an average diameter of 10 μm or smaller, and the fine ferrite has an area ratio in a range of 90 vol % or larger. More preferably, the fine ferrite has an average diameter of 3 to 7 μm, and the fine ferrite has an area ratio in a range of 75 to 90 vol %. Furthermore, it is more preferable that the welded zone of the steel pipe for the line pipe has a shock absorption energy value at −45° C. in a range of 100 to 200J.

1. Manufacturing of Specimen

After welding steel sheet specimens for the line pipe having compositions as indicated in Table 1 in the electric resistance welding scheme, the steel pipe specimens for the line pipe according to Present Examples 1 to 8 and Comparative Examples 1 to 6 under process conditions as indicated in Table 2 were manufactured. In this regard, in Present Examples 1 to 8 and Comparative Examples 4 to 6, the welded zone was subjected to the high frequency heat-treatment, followed by the rapid-cooling, then, the air-cooling, and then, the water-cooling. In Comparative Examples 1 to 3, the welded zone was subjected to the high frequency heat-treatment, and then to the air-cooling, and then the water-cooling, wherein the rapid-cooling was not performed.

TABLE 1

| | | | | | | | | | (Unit: wt %) | |
|---|---|---|---|---|---|---|---|---|---|---|
| Examples | C | Si | Mn | Sol. Al | Ti | Nb | V | Mo | P | S |
| Present Example 1 | 0.03 | 0.30 | 1.1 | 0.03 | 0.01 | 0.04 | 0.03 | 0.3 | 0.006 | 0.004 |
| Present Example 2 | 0.03 | 0.30 | 1.1 | 0.03 | 0.01 | 0.03 | 0.04 | 0.4 | 0.006 | 0.004 |
| Present Example 3 | 0.03 | 0.30 | 1.2 | 0.03 | 0.01 | 0.05 | 0.05 | 0.2 | 0.006 | 0.004 |
| Present Example 4 | 0.04 | 0.30 | 1.3 | 0.03 | 0.03 | 0.04 | 0.03 | 0.4 | 0.006 | 0.004 |
| Present Example 5 | 0.05 | 0.40 | 1.1 | 0.03 | 0.04 | 0.05 | 0.03 | 0.5 | 0.006 | 0.004 |
| Present Example 6 | 0.02 | 0.15 | 1.2 | 0.03 | 0.01 | 0.06 | 0.04 | 0.1 | 0.006 | 0.004 |
| Present Example 7 | 0.06 | 0.20 | 1.3 | 0.03 | 0.05 | 0.03 | 0.05 | 0.4 | 0.006 | 0.004 |
| Present Example 8 | 0.05 | 0.30 | 1.1 | 0.03 | 0.01 | 0.04 | 0.06 | 0.3 | 0.006 | 0.004 |
| Comparative Example 1 | 0.03 | 0.30 | 1.1 | 0.03 | 0.03 | 0.05 | — | 0.3 | 0.006 | 0.004 |
| Comparative Example 2 | 0.03 | 0.30 | 1.1 | 0.03 | 0.04 | 0.04 | 0.04 | 0.4 | 0.006 | 0.004 |
| Comparative Example 3 | 0.03 | 0.30 | 1.2 | 0.03 | 0.01 | — | 0.05 | 0.1 | 0.006 | 0.004 |
| Comparative Example 4 | 0.04 | 0.25 | 1.1 | 0.03 | 0.04 | 0.03 | — | 0.3 | 0.006 | 0.004 |
| Comparative Example 5 | 0.05 | 0.40 | 1.2 | 0.03 | — | 0.04 | 0.04 | — | 0.006 | 0.004 |
| Comparative Example 6 | 0.03 | 0.35 | 1.3 | 0.03 | 0.03 | 0.05 | 0.05 | 0.2 | 0.006 | 0.004 |

TABLE 2

| Examples | High frequency heat-treatment temperature (° C.) | High frequency heat-treatment time (sec) | Rapid cooling target temperature (° C.) | Rapid cooling rate (° C./sec) | Air cooling target temperature (° C.) | Water cooling Target temperature (° C.) | Water cooling rate (° C./sec) |
|---|---|---|---|---|---|---|---|
| Present Example 1 | 960 | 10 | 650 | 30 | 300 | 15 | 5 |
| Present Example 2 | 960 | 10 | 650 | 30 | 300 | 17 | 4 |
| Present Example 3 | 920 | 11 | 650 | 25 | 300 | 18 | 5 |
| Present Example 4 | 970 | 12 | 650 | 35 | 300 | 16 | 4 |
| Present Example 5 | 980 | 10 | 650 | 25 | 300 | 15 | 3 |
| Present Example 6 | 930 | 9 | 650 | 25 | 300 | 17 | 6 |
| Present Example 7 | 910 | 10 | 650 | 30 | 300 | 18 | 5 |
| Present Example 8 | 900 | 8 | 650 | 30 | 300 | 20 | 4 |
| Comparative Example 1 | 1,000 | 10 | — | — | 300 | 16 | 5 |
| Comparative Example 2 | 1,000 | 12 | — | — | 300 | 15 | 6 |

TABLE 2-continued

| Examples | High frequency heat-treatment temperature (° C.) | High frequency heat-treatment time (sec) | Rapid cooling target temperature (° C.) | Rapid cooling rate (° C./sec) | Air cooling target temperature (° C.) | Water cooling Target temperature (° C.) | Water cooling rate (° C./sec) |
|---|---|---|---|---|---|---|---|
| Comparative Example 3 | 1,000 | 11 | — | — | 300 | 17 | 4 |
| Comparative Example 4 | 960 | 10 | 720 | 20 | 300 | 15 | 6 |
| Comparative Example 5 | 940 | 12 | 730 | 19 | 300 | 16 | 5 |
| Comparative Example 6 | 920 | 13 | 740 | 17 | 300 | 17 | 4 |

2. Property Evaluation

Table 3 shows the results of property evaluation of the steel pipe specimens for the line pipe according to Present Examples 1 to 8 and Comparative Examples 1 to 6. In this regard, tensile strength and yield strength of the welded zone of each of the steel pipe specimens for the line pipe manufactured according to Present Examples 1 to 8 and Comparative Examples 1 to 6 were measured using a tensile tester in accordance with ASTM A370.

TABLE 3

| Examples | Mechanical strength | | |
|---|---|---|---|
| | Yield strength (MPa) | Tensile strength (MPa) | Shock absorption energy (−45° C., J) |
| Present Example 1 | 756 | 811 | 152 |
| Present Example 2 | 761 | 812 | 182 |
| Present Example 3 | 757 | 806 | 173 |
| Present Example 4 | 749 | 809 | 169 |
| Present Example 5 | 753 | 810 | 181 |
| Present Example 6 | 762 | 813 | 157 |
| Present Example 7 | 758 | 807 | 175 |
| Present Example 8 | 761 | 805 | 180 |
| Comparative Example 1 | 712 | 769 | 6 |
| Comparative Example 2 | 706 | 774 | 7 |
| Comparative Example 3 | 705 | 781 | 9 |
| Comparative Example 4 | 710 | 793 | 12 |
| Comparative Example 5 | 721 | 785 | 13 |
| Comparative Example 6 | 716 | 768 | 10 |

As shown in Table 1 to Table 3, it was identified based on a result of measuring the mechanical properties of the welded zone of each of the steel pipe specimens for the line pipe manufactured according to Present Examples 1 to 8, and Comparative Examples 1 to 6 that the tensile strength and yield strength of the welded zone of each of the steel pipe specimens for the line pipe manufactured according to Present Examples 1 to 8 were superior to those of the welded zone of each of the steel pipe specimens for the line pipe manufactured according to Comparative Examples 1 to 6.

In particular, it was identified based on a result of measuring the mechanical properties of the welded zone of each of the steel pipe specimens for the line pipe manufactured according to Present Examples 1 to 8 that the shock absorption energy value at −45° C. of the welded zone of each of the steel pipe specimens for the line pipe manufactured according to Present Examples 1 to 8 was 152J or larger, indicating that the low-temperature impact toughness thereof was very good.

On the other hand, it was identified based on a result of measuring the mechanical properties of the welded zone of each of the steel pipe specimens for the line pipe manufactured according to Comparative Examples 1 to 6 that the shock absorption energy value at −45° C. of the welded zone of each of the steel pipe specimens for the line pipe manufactured according to Comparative Examples 1 to 6 was smaller than 13J, indicating that the low-temperature impact toughness thereof was very poor.

3. Microstructure Observation

Figure 5:
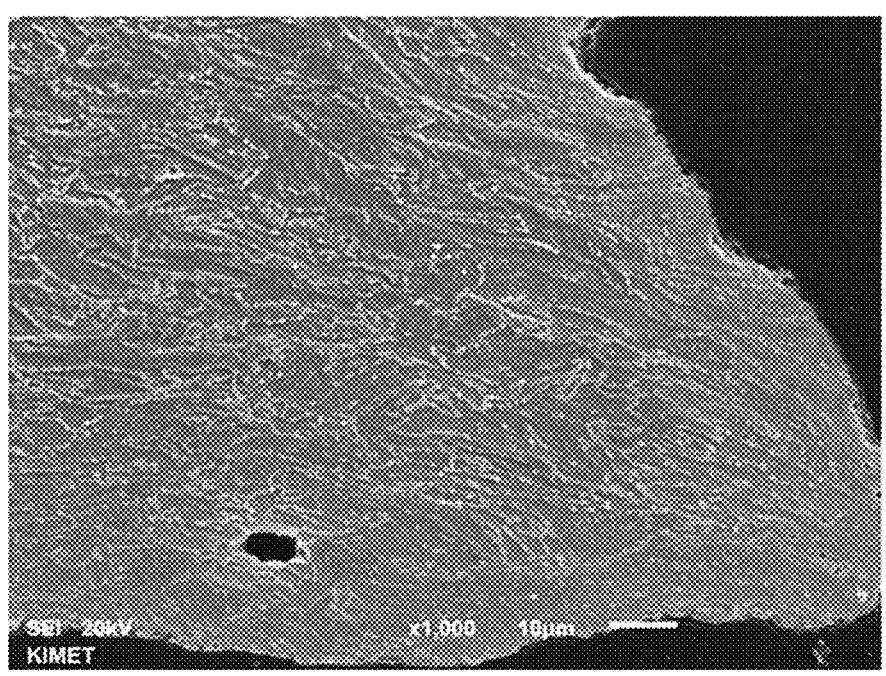
FIG. 5 is a SEM photograph showing a steel pipe specimen for a line pipe manufactured according to Present Example 1.
Figure 6:
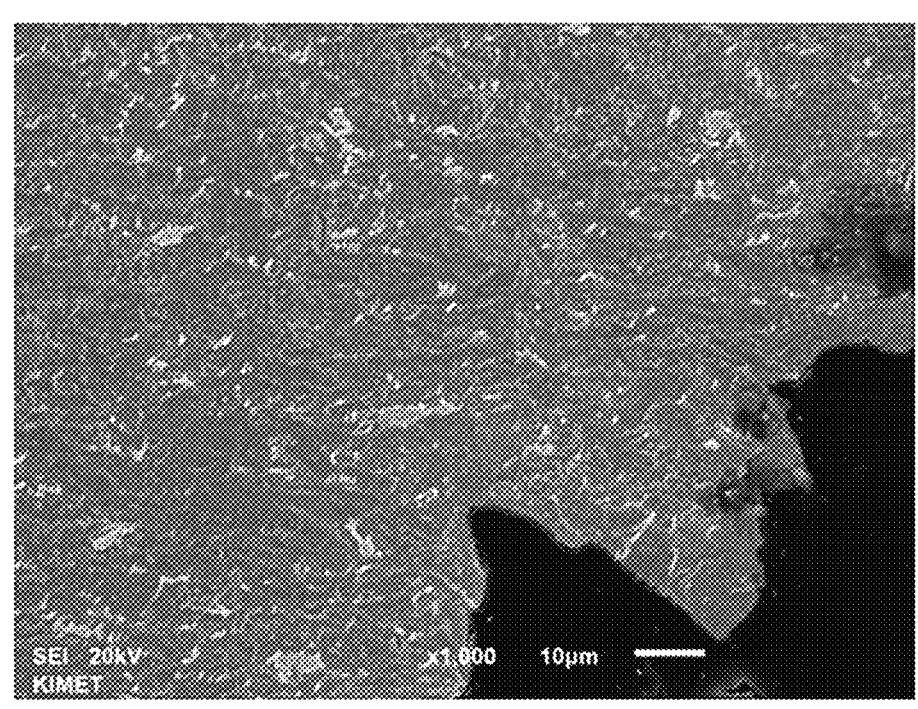
FIG. 6 is a SEM photograph showing a steel pipe specimen for a line pipe manufactured according to Present Example 2.

FIG. 5 is a SEM photograph showing a steel pipe specimen for a line pipe manufactured according to Present Example 1, and FIG. 6 is a SEM photograph showing a steel pipe specimen for a line pipe manufactured according to Present Example 2. In this regard, the welded zone of each of the steel pipe specimens according to Present Examples 1 and 2 was welded in the electric resistance welding scheme.

As shown in FIG. 5 and FIG. 6, it may be identified that the welded zone of the steel pipe specimen manufactured according to each of Present Examples 1 and 2 was subjected to appropriate high frequency heat-treatment and the rapid-cooling, resulting in having a final microstructure of the complex phase of spheroidal carbide and fine ferrite.

In this regard, it was identified that in the welded zone of the steel sheet specimen manufactured according to each of Present Examples 1 to 2, most of spherical carbides exist in a point phase, resulting in a very good structure.

Figure 7:
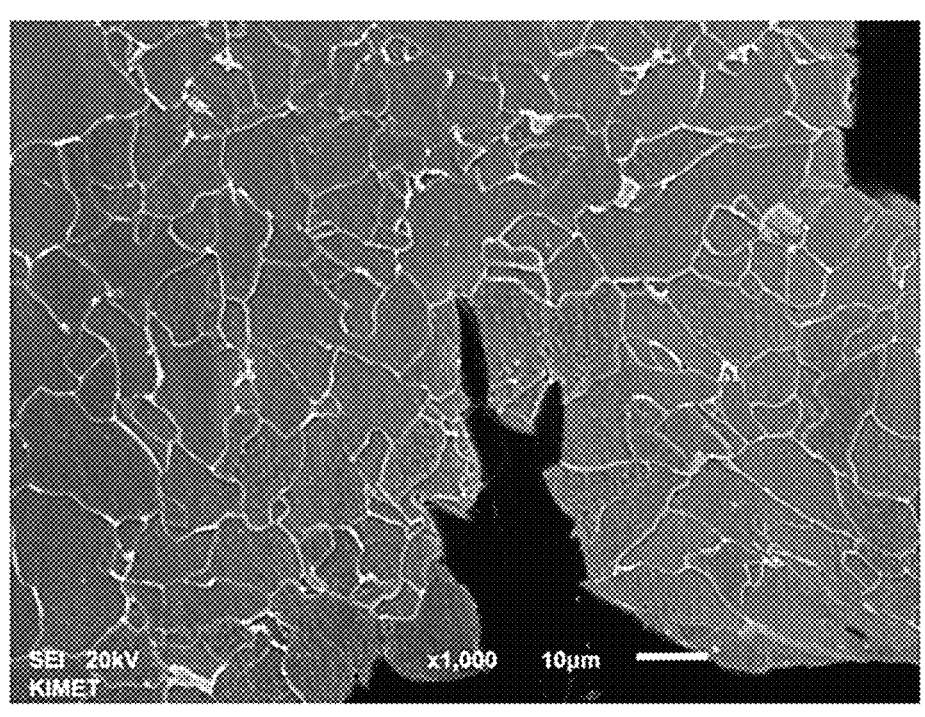
FIG. 7 is a SEM photograph showing a steel pipe specimen for a line pipe manufactured according to Comparative Example 1.
Figure 8:
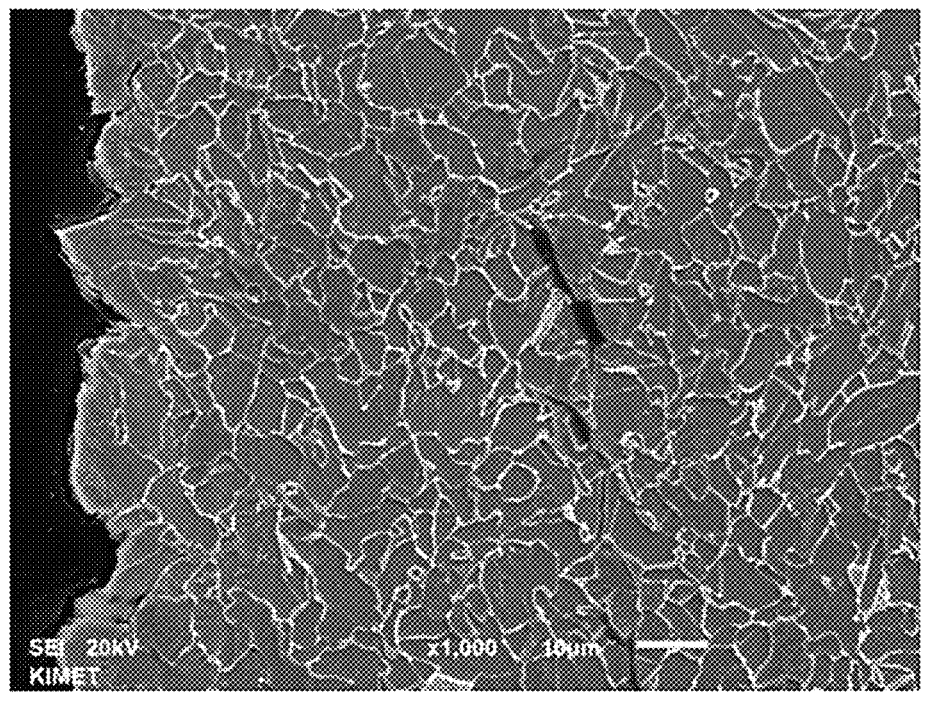
FIG. 8 is a SEM photograph showing a steel pipe specimen for a line pipe manufactured according to Comparative Example 4.

FIG. 7 is a SEM photograph showing a steel pipe specimen for a line pipe manufactured according to Comparative Example 1. FIG. 8 is a SEM photograph showing a steel pipe specimen for a line pipe manufactured according to Comparative Example 4. In this regard, the welded zone of each of the steel pipe specimens according to each of Comparative Example 1 and Comparative Example 4 was welded in the electric resistance welding scheme.

As shown in FIG. 7 and FIG. 8, it may be identified that the welded zone of the steel pipe specimen for the line pipe manufactured according to Comparative Example 1 are composed of a pearlite structure and carbides precipitated at grain boundaries because the welded zone of the steel pipe specimen for the line pipe manufactured according to Comparative Example 1 is subjected to the high frequency heat treatment of 1,000° C., followed by air-cooling to 300° C. and then, the water-cooling, wherein the rapid cooling is not performed. In this regard, it may be identified that in the welded zone of steel pipe specimen for the line pipe manufactured according to Comparative Example 1, cracks occur. These cracks are produced and propagate due to carbides precipitated at the grain boundaries and the pearlite interface, thereby lowering the low temperature toughness.

Furthermore, it may be identified that the welded zone of the steel pipe specimen for the line pipe manufactured according to Comparative Example 4 is composed of a pearlite structure and carbides precipitated at the grain boundaries because the rapid-cooling target temperature is high.

Although the embodiments of the present disclosure have been described above with reference to the accompanying drawings, the present disclosure may not be limited to the embodiments and may be implemented in various different forms. Those of ordinary skill in the technical field to which the present disclosure belongs will be able to understand that the present disclosure may be implemented in other specific forms without changing the technical idea or essential features of the present disclosure. Therefore, it should be understood that the embodiments as described above are not restrictive but illustrative in all respects.

What is claimed is:

1. A method for manufacturing a steel pipe for a line pipe with excellent low temperature toughness of a welded zone thereof, the method comprising:

(a) welding the welded zone in an electric resistance welding scheme while shaping a steel sheet for a line pipe containing 0.02 to 0.07% by weight of carbon into a cylindrical shape using a squeeze roll, thereby forming the steel pipe for the line pipe;

(b) performing selectively high frequency heat-treatment of only the welded zone of the steel pipe for the line pipe;

(c) rapidly-cooling selectively only the high frequency heat-treated welded zone to 550 to 710° C.;

(d) air-cooling the rapidly-cooled welded zone to 300 to 400° C.; and (e) water-cooling the air-cooled welded zone, after the (e), wherein a microstructure of the welded zone of the steel pipe for the line pipe has a complex phase including spherical carbide and fine ferrite, wherein a shock absorption energy value of the welded zone at −45° C. is 100~200 J.

2. The method of claim 1, wherein in the (a), the steel sheet for the line pipe contains:

0.02 to 0.07% by weight of carbon, 0.1 to 1.0% by weight of silicon, 1.0 to 2.0% by weight of manganese, 0.01 to 0.06% by weight of water-soluble aluminum, 0.001 to 0.10% by weight of titanium, 0.01 to 0.06% by weight of niobium, 0.01 to 0.1% by weight of vanadium, 0.1 to 0.6% by weight of molybdenum, 0.01% or smaller by weight of phosphorus, 0.01% or smaller by weight of sulfur, and the remainder Fe and unavoidable impurities.

3. The method of claim 1, wherein in the (b), the high frequency heat-treatment is carried out to a temperature of 900 to 980° C.

4. The method of claim 1, wherein in the (c), the rapid-cooling is carried out to a temperature of 640 to 680° C. and at a rate of 10 to 50° C./sec.

5. The method of claim 1, wherein the rapid-cooling is carried out using a rapid- cooling device, wherein the rapid-cooling device includes:

a plurality of rapid-cooling nozzles spaced apart from the steel pipe for the line pipe and arranged so as to be spaced from each other; and a nozzle support supporting the rapid-cooling nozzles thereon.

6. The method of claim 5, wherein each of the rapid-cooling nozzles is installed so as to have an inclination of 20 to 40° with respect to a plane perpendicular to a surface of the welded zone of the steel pipe for the line pipe, wherein the rapid-cooling device sprays cooling water at a pressure of 3 to 10 kgf/cm$^2$ to the welded zone.

* * * * *